(12) United States Patent
Li et al.

(10) Patent No.: US 11,513,947 B2
(45) Date of Patent: Nov. 29, 2022

(54) METHOD, DEVICE AND COMPUTER PROGRAM PRODUCT FOR BUILDING AND VERIFYING INDEX FILE

(71) Applicant: EMC IP Holding Company LLC, Hopkinton, MA (US)

(72) Inventors: Haitao Li, Chengdu (CN); Jie Liu, Chengdu (CN); Jian Wen, Chengdu (CN); Chao Lin, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 10 days.

(21) Appl. No.: 16/888,788

(22) Filed: May 31, 2020

(65) Prior Publication Data

US 2021/0303458 A1    Sep. 30, 2021

(30) Foreign Application Priority Data

Mar. 25, 2020  (CN) .......................... 202010220619.9

(51) Int. Cl.
| | | |
|---|---|---|
| *G06F 12/02* | (2006.01) | |
| *G06F 12/08* | (2016.01) | |
| *G06F 21/60* | (2013.01) | |
| *G06F 11/30* | (2006.01) | |
| *G06F 9/30* | (2018.01) | |
| *G06F 12/0864* | (2016.01) | |

(52) U.S. Cl.
CPC ...... *G06F 12/0246* (2013.01); *G06F 9/30029* (2013.01); *G06F 11/3034* (2013.01); *G06F 12/0864* (2013.01); *G06F 21/602* (2013.01)

(58) Field of Classification Search
CPC ............... G06F 12/0246; G06F 21/602; G06F 12/0864; G06F 9/30029; G06F 11/3034; G06F 9/355; G06F 16/137; G06F 16/22; G06F 16/31
See application file for complete search history.

(56) References Cited

U.S. PATENT DOCUMENTS

| | | | | |
|---|---|---|---|---|
| 2014/0289475 A1* | 9/2014 | Kokuryo | ............. | G06F 12/0862 711/133 |
| 2016/0371291 A1* | 12/2016 | Shamis | ................. | G06F 16/282 |
| 2018/0260334 A1* | 9/2018 | Asano | ................. | G06F 12/0246 |
| 2019/0243903 A1* | 8/2019 | Yang | ................... | G06F 12/0246 |
| 2020/0004540 A1* | 1/2020 | Navon | ................. | G06F 3/0683 |

* cited by examiner

*Primary Examiner* — Masud K Khan
(74) *Attorney, Agent, or Firm* — Chamberlain, Hrdlicka, White, Williams & Aughtry (57) ABSTRACT

Embodiments of the present disclosure relate to establishing and verifying an index file. The method for establishing an index file includes: in response to receiving a data block to be stored, determining first verification information for verifying the data block and a first storage address for storing the data block. This method further includes: based on the first verification information, determining an index entry for the data block and a second storage address for storing the index entry, wherein the index entry includes the first verification information and the first storage address, and the index entry will be included in the index file. This method further includes: based on the index entry and the second storage address, determining second verification information. This method further includes: based on the second verification information and historical verification information for the index file, determining third verification information for verifying the index file.

14 Claims, 6 Drawing Sheets

METHOD, DEVICE AND COMPUTER PROGRAM PRODUCT FOR BUILDING AND VERIFYING INDEX FILE

CROSS-REFERENCE TO RELATED APPLICATIONS

This application claims priority to Chinese Patent Application No. 202010220619.9 filed on Mar. 25, 2020. Chinese Patent Application No. 202010220619.9 is hereby incorporated by reference in its entirety.

TECHNICAL FIELD

Embodiments of the present disclosure relate to the field of data processing, and in particular to methods for establishing and verifying an index file, devices and computer program products.

BACKGROUND

Due to the rapid development of computer technologies, the number of computer applications has increased quickly. With the increase of computer applications, the amount of data processed has also increased quickly. Generally, the processed data or the generated new data needs to be stored or protected by a data storage system. The data storage system usually protects users' data. When the users need the data, their data can be retrieved via the data storage system.

Service providers now provide a large number of storage devices to store data. At this time, servers of the service providers receive data from clients and other servers, and perform various processing on new data when storing the new data. For example, a backup file system running on the servers is used to manage the received data. However, there are still many issues that need to be addressed during the processing of data by the servers.

SUMMARY OF THE INVENTION

Embodiments of the present disclosure provide methods for establishing and verifying an index file, devices and computer program products.

According to a first aspect of the present disclosure, a method for establishing an index file is provided. This method includes: in response to receiving a data block to be stored, determining first verification information for verifying the data block and a first storage address for storing the data block. This method further includes: based on the first verification information, determining an index entry for the data block and a second storage address for storing the index entry, wherein the index entry includes the first verification information and the first storage address, and the index entry will be included in the index file. This method further includes: based on the index entry and the second storage address, determining second verification information. This method further includes: based on the second verification information and historical verification information for the index file, determining third verification information for verifying the index file.

According to a second aspect of the present disclosure, a method for verifying an index file is provided. This method includes: in response to receiving a request for verifying the index file, based on first verification information for at least one index entry in the index file, determining a second storage address for storing the at least one index entry, wherein the first verification information is used for a data block corresponding to the at least one index entry. This method further includes: based on the at least one index entry and the second storage address, determining second verification information. This method further includes: based on the second verification information and third verification information for verifying the index file, determining the correctness of the index file.

According to the third aspect of the present disclosure, an electronic device is provided. The electronic device includes: a processor; and a memory storing computer program instructions, wherein the processor executes the computer program instructions in the memory to control the electronic device to execute actions including: in response to receiving a data block to be stored, determining first verification information for verifying the data block and a first storage address for storing the data block; based on the first verification information, determining an index entry for the data block and a second storage address for storing the index entry, wherein the index entry includes the first verification information and the first storage address, and the index entry will be included in the index file; based on the index entry and the second storage address, determining second verification information; and based on the second verification information and historical verification information for the index file, determining third verification information for verifying the index file.

According to the fourth aspect of the present disclosure, an electronic device is provided. This electronic device includes: a processor; and a memory storing computer program instructions, wherein the processor executes the computer program instructions in the memory to control the electronic device to execute actions including: in response to receiving a request for verifying the index file, based on first verification information in at least one index entry in the index file, determining a second storage address for storing the at least one index entry, wherein the first verification information is used for verifying a data block corresponding to the at least one index entry; based on the at least one index entry and the second storage address, determining second verification information; and based on the second verification information and third verification information for verifying the index file, determining the correctness of the index file.

According to a fifth aspect of the present disclosure, a computer program product is provided, the computer program product being tangibly stored on a non-volatile computer-readable medium and including machine-executable instructions which, when executed, cause a machine to implement the steps of the method in the first aspect of the present disclosure.

According to a sixth aspect of the present disclosure, a computer program product is provided, the computer program product being tangibly stored on a non-volatile computer-readable medium and including machine-executable instructions which, when executed, cause a machine to implement the steps of the method in the first aspect of the present disclosure.

BRIEF DESCRIPTION OF THE DRAWINGS

The above and other objects, features, and advantages of the present disclosure will become more apparent by describing the example embodiments of the present disclosure in more detail with reference to the accompanying drawings. In the example embodiments of the present disclosure, the same reference numerals generally represent the same parts.

The same or corresponding reference numerals in the various drawings represent the same or corresponding parts.

DETAILED DESCRIPTION

Hereinafter, embodiments of the present disclosure will be described in more detail with reference to the accompanying drawings. Although the accompanying drawings show certain embodiments of the present disclosure, it should be understood that the present disclosure may be implemented in various forms and should not be construed as limited to the embodiments set forth herein. Rather, these embodiments are provided for a more thorough and complete understanding of the present disclosure. It should be understood that the accompanying drawings and embodiments of the present disclosure are only for example purposes, and are not intended to limit the scope of protection of the present disclosure.

In the description of the embodiments of the present disclosure, the term "including" and similar terms should be understood as non-exclusive inclusion, that is, "including but not limited to." The term "based on" should be understood as "based at least in part on." The terms "one embodiment" or "the embodiment" should be understood as "at least one embodiment." The terms "first," "second," etc. may refer to different or the same objects. Other explicit and implicit definitions may be included below.

The principles of the present disclosure will be described below with reference to several example embodiments shown in the drawings. Although the preferred embodiments of the present disclosure are shown in the accompanying drawings, it should be understood that these embodiments are described only to enable those skilled in the art to better understand and implement the present disclosure, and not to limit the scope of the present disclosure in any way.

In a conventional backup file system, a server usually receives data blocks to be stored, for example, the server receives a data blocks for a file to be stored from a client. The server stores the received data blocks and creates index entries corresponding to the data blocks and stores the index entries in the index file.

Figure 1:
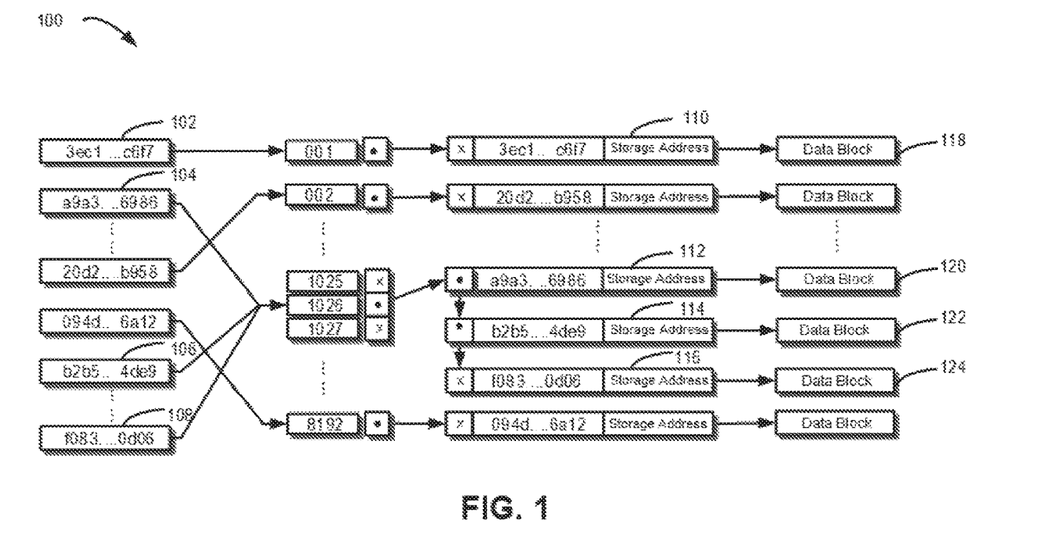
FIG. 1 illustrates a schematic diagram of correspondence relationship 100 between index entries and data blocks established in a conventional solution.

FIG. 1 illustrates a schematic diagram of a correspondence relationship between the index entries and the data blocks established in the conventional solution. As shown in FIG. 1, after the server receives data blocks 118, 120, 122, and 124, the server performs hash operations on data blocks 118, 120, 122, and 124, respectively, to generate verification information 102, 104, 106, and 108 corresponding to data blocks 118, 120, 122, and 124, for example, the server processes the data blocks 118, 120, 122, and 124 using the SAH-1 algorithm to generate corresponding hash values. The generated verification information 102, 104, 106, and 108 and storage addresses of data blocks 118, 120, 122, and 124 form index entries 110, 112, 114, and 116, respectively, and the index entries are then stored in an index file.

Storage addresses of the formed index entries 110, 112, 114, and 116 in the index file are determined by performing hash operations on verification information 102, 104, 106, and 108 for the data blocks, for example, processing verification information 102, 104, 106, and 108 by means of a hash function to determine offset addresses for storing index entries 110, 112, 114, and 116. The index entries are stored at the determined offset addresses if there are no other index entries in the offset addresses. For example, index entry 110 is stored in offset address 1 in the index file, where the representation form of this offset address is only an example. If the storage locations in the index file of the index entries which are determined from the verification information of different data blocks are the same, the index entries with the same storage location are linked in a form of a linked list, such as forming a bucket. As shown in FIG. 1, the offset addresses of index entries 112, 114, and 116 in the index file are 1026, then a linked list is formed at this offset address to store these index entries.

After the index entries are stored in the index file, since new block data will appear and old data will be deleted, the index entries are always changing. Sometimes it is even necessary to remap the entire index file, for example, during the process of splitting the index file. In addition, hard disks have a lifetime, and the server needs to know what data are lost due to defective disks. Therefore, it is necessary to check the correctness of the data blocks and the index file.

However, during the process of checking the index file, the server reads to-be-verified index entries in the index file. For example, after reading one to-be-verified index entry, a hash function is used to process the verification information of the data block in the to-be-verified index entry. If the server determines offset address 1 of the to-be-verified index entry in the index file, at this moment, the server retrieves index entry 110 from offset address 1 in the index file, and compares the to-be-verified index entry with index entry 110 to determine whether this to-be-verified index entry is correct. If the to-be-verified index entry is the same as the newly retrieved index entry 110, it indicates that this to-be-verified index entry is correct, and then the verification is continued on other to-be-verified index entries. If the index entry is not found, it indicates that the to-be-verified index entry in the index file is inconsistent with its offset address in the index file, and then an error is reported. If the server determines that the offset address of the to-be-verified index entry in the index file is 1026, the server traverses the linked list at offset address 1026 to find whether there is an index entry matching the to-be-verified index entry. Since the above operation process needs to be performed on each index entry in the index file when verifying the index file, the verification process for the index file may take a long time, resulting in a low processing efficiency of the processor.

In order to solve the above and other potential problems, the present disclosure provides methods for establishing and verifying an index file. In the method for establishing an index file in accordance with one or more embodiments of the invention, a server first determines, according to a received data block, first verification information for verifying the data block and a first storage address for storing the data block. Then the server determines, according to the first verification information, an index entry for the data block and a second storage address for storing the index entry. The server then determines second verification information from the index entry and the second storage address. Afterwards, based on the second verification information and historical verification information for the index file, the server determines third verification information for verifying the index file. The third verification information is used for verifying the index file later. With the above method, the verification information for the index file can be obtained quickly and accurately, which reduces the consumption of computing resources; moreover, when verifying the index file, not only the correctness of the index file can be verified, but also whether the storage location of the index entry is correct can be verified, thereby saving time and improving the efficiency of verification.

Figure 2:
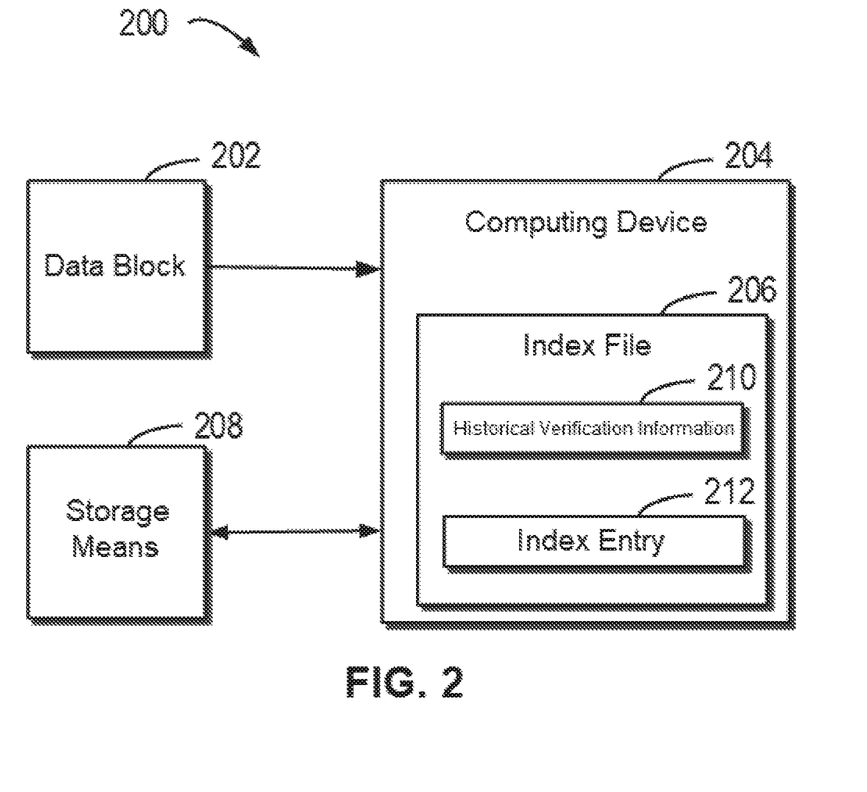
FIG. 2 illustrates a schematic diagram of example environment 200 in which the devices and/or methods according to embodiments of the present disclosure may be implemented.

Hereinafter, embodiments of the present disclosure will be described in detail with reference to FIGS. 2 to 6. FIG. 2 illustrates a schematic diagram of example environment 200 in which the devices and/or methods according to embodiments of the present disclosure may be implemented.

As shown in FIG. 2, example environment 200 includes computing device 204. Computing device 204 receives data block 202 and manages the storage of data block 202. In some embodiments, data block 202 is a data file from a client. In some embodiments, data block 202 is a data file from another server in communication with computing device 204. The above examples are for description of the present disclosure only, and are not intended to specifically limit the present disclosure.

After receiving data block 202, computing device 204 will generate verification information for verifying data block 202. In some embodiments, computing device 204 performs a hash operation on data block 202 to generate a hash value corresponding to data block 202, for example, performs an SAH-1 operation or an MD5 operation. In some embodiments, computing device 204 performs other specific operations on all or a portion of the contents of data block 202 to obtain the verification information. The above examples are for description of the present disclosure only, and are not intended to specifically limit the present disclosure.

Computing device 204 further stores data block 202 in storage 208. After storing data block 202 to storage 208, computing device 204 will obtain the storage address of data block 202 in storage 208.

After obtaining the storage address of data block 202, computing device 204 uses the verification information for data block 202 and the storage address of data block 202 to form index entry 212 and stores index entry 212 in index file 206. When storing index entry 212 in index file 206, computing device 204 further determines the storage address of index entry 212 in index file 206 based on the verification information for data block 202, for example, determines the offset address of index entry 212 in index file 206 by performing a hash function on the verification information. Afterwards, computing device 204 stores index entry 212 at the offset address in index file 206.

When index entry 212 is stored, if there is no index entry stored at this storage address, this index entry 212 is stored at this location. If there has already been an index entry stored at this offset address, a new linked list entry corresponding to this storage address may be formed and added to the linked list at the storage address.

It is shown in FIG. 2 that index file 206 includes index entry 212, and this is only an example but not a limitation on the present disclosure. In some embodiments, when index entry 212 is stored, one or more index entries have already been stored in index file 206. In some embodiments, index entry 212 is the first index entry in index file 206.

Different from the conventional solution, in addition to storing index entry 212, index file 206 also stores historical verification information 210 for index file 206 which is determined from the previously stored index entries. When computing device 204 stores index entry 212, it is also necessary to perform a hash operation on the combination of index entry 212 and the storage address of index entry 212 to generate second verification information. The computing device 204 then performs a logic operation, for example, an XOR operation, on this second verification information and historical verification information 210 for index file 206 which is stored in index file 206 to generate third verification information.

In some embodiments, when index entry 212 is the first index entry of index file 206, historical verification information 210 is 0. Then, the XOR operation is performed on the second verification information for index entry 212 and historical verification information 210 to generate the third verification information. The third verification information is stored in index file 206 as historical verification information 210 for index file 206. When index entry 212 is the second index entry in index file 206, historical verification information 210 is acquired. Then, an XOR operation is performed on the second verification information for index entry 212 and historical verification information 210 to generate the third verification information. The third verification information is then stored in index file 206 as historical verification information 210. Similarly, for each new index entry, an XOR operation is performed on second verification information for the new index entry and historical verification information 210 to update historical verification information 210. The above examples are for description of the present disclosure only, and are not intended to specifically limit the present disclosure.

When computing device 204 verifies index file 206, computing device 204 reads all index entries in index file 206. Then, for each index entry, the second verification value for each index entry is calculated. Then, a logic operation, for example, an XOR operation, is performed on all the second verification values to generate second verification information for said index file 206. Then computing device 204 further acquires historical verification information 210 from index file 206 to compare historical verification information 210 with the second verification information in order to determine the correctness of index file 206.

Computing device 204 includes but is not limited to a personal computer, a server computer, a handheld or laptop device, a mobile device (such as a mobile phone, a personal digital assistant (PDA), a media player, etc.), a multi-processor system, a consumer electronic product, a small computer, a mainframe computer, a distributed computing environment including any of the above systems or devices, etc.

It is shown in FIG. 2 that storage 208 is a storage external to computing device 204, which is only an example and is not intended to specifically limit the present disclosure. In other examples, computing device 204 may also include storage 208. Alternatively or additionally, index file 206 is also stored in storage 208.

A schematic diagram of environment 200 in which devices and/or methods according to embodiments of the present disclosure can be implemented has been described above with reference to FIG. 2. Hereinafter, a flowchart of method 300 for establishing an index file according to an embodiment of the present disclosure will be described with reference to FIG. 3. Method 300 may be performed at computing device 204 in FIG. 2 or any other suitable devices.

Figure 3:
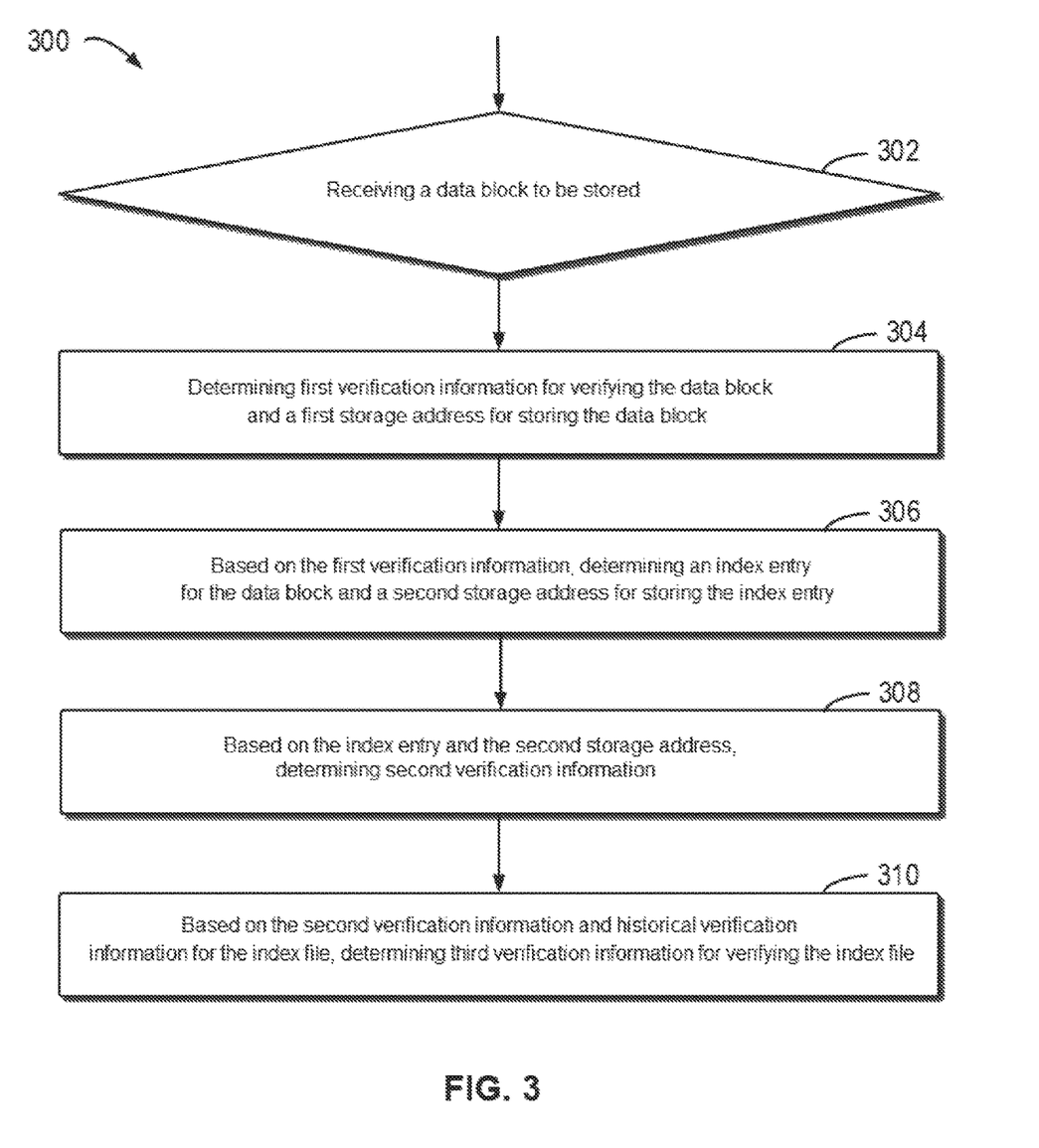
FIG. 3 illustrates a flowchart of method 300 for establishing an index file according to an embodiment of the present disclosure.

At block 302, computing device 204 determines whether data block 202 to be stored is received. Upon receiving data block 202, at block 304, computing device 204 determines first verification information for verifying data block 202 and a first storage address for storing data block 202.

In some embodiments, computing device 204 performs a first hash operation on data block 202 to determine the first verification information. For example, an SAH-1 operation or an MD-5 operation is performed on data block 202 to generate a hash value corresponding to data block 202, wherein this hash value is used as the verification information for data block 202. By performing the hash operation, the time for determining the first verification information can be reduced.

In some embodiments, the generated first verification information can be used for verifying data block 202. When verifying data block 202, computing device 204 may re-perform the same hash operation on data block 202 to generate new verification information. Then, the newly generated verification information is compared with this first verification information to determine whether data block 202 is correct. When the newly generated verification information matches the first verification information, it indicates that data block 202 is correct, otherwise a message indicating that data block 202 is wrong is issued.

In some embodiments, computing device 204 stores data block 202 on storage 208. Computing device 204 obtains the storage address of data block 202 on storage 208 as the first storage address.

At block 306, computing device 204 determines, based on the first verification information, index entry 212 for data block 202 and a second storage address for storing index entry 212. When storing data block 202, computing device 204 needs to store a data entry corresponding to this data block 202 in index file 206 in order to manage this data block 202. Index entry 212 generated by computing device 204 includes the first verification information and the first storage address.

Computing device 204 further needs to determine the storage address of index entry 212 in index file 206. In some examples, computing device 204 performs a second hash operation on the first verification information. Computing device 204 then determines the offset address of index entry 212 in index file 206 based on a result of the second hash operation. For example, a hash function is used to process the first verification information to generate the offset address. After determining the offset address of index entry 212, computing device 204 may store index entry 212 at the offset address in index file 206. In some embodiments, computing device 204 may use a portion of the first verification information as the second storage address. The above examples are for description of the present disclosure only, and are not intended to specifically limit the present disclosure.

By using the hash operation to form the storage address of the index entry for the data block, the index entry can be found quickly and accurately, thereby saving time for searching for the index entry.

At block 308, computing device 204 determines the second verification information based on index entry 212 and the second storage address. The second verification information will be used to generate verification information for index file 206.

In some embodiments, computing device 204 further makes the second storage address to be included in index entry 212, and then generates the second verification information by performing a third hash operation on the first verification information, the first storage address, and the second verification information in index entry 212. In some embodiments, computing device 204 combines index entry 212 with the second storage address, for example, attaches the second storage address to index entry 212 or attaches index entry 212 to the second storage address. Computing device 204 then performs the third hash operation on this combination to generate second verification information. In some embodiments, computing device 204 simply combines index entry 212 and the second storage address as the second verification information. By performing the hash operation, the second verification information can be generated quickly and conveniently as in the above example. The above examples are for description of the present disclosure only, and are not intended to specifically limit the present disclosure.

At block 310, based on the second verification information and historical verification information 210 for index file 206, computing device 204 determines third verification information for verifying index file 206.

In some embodiments, computing device 204 performs an XOR operation on the second verification information and historical verification information 210 to generate the third verification information. The above operations can be implemented through the following equation (1):

$$\begin{cases} EH_i = HASH(CE_i + \text{offset}_i) \\ PH_i = \begin{cases} 0 & (i == 0) \\ PH_{i-1} \, XOR \, EH_i & (i >= 1) \end{cases} \end{cases} \quad (1)$$

where $CE_i$ denotes the ith index entry in index file 206; $\text{offset}_i$ denotes the offset address of the ith index entry in index file 206, + denotes attachment, HASH ( ) denotes the hash method used in the calculation, which can be any suitable hash method, $EH_i$ denotes an index hash for the ith index entry, which index hash is the second verification information for the ith index entry, $PH_{i-1}$ denotes historical verification information 210 for index file 206 before the ith index entry, and $PH_i$ denotes the third verification information after the ith index entry is stored in index file 206, which third verification information is then used as the new historical verification information for index file 206. When i is 0, it indicates that there is no index entry in index file 206, and then historical verification information 210 is directly set to 0.

In some embodiments, computing device 204 makes the third verification information to be included in historical verification information 210. In some embodiments, computing device 204 stores the third verification information in the header of index file 206 to replace historical verification information 210. The above examples are for description of the present disclosure only, and are not intended to specifically limit the present disclosure.

With the above method, the verification information for the index file can be obtained quickly and accurately, which reduces the consumption of computing resources; moreover, when verifying the index file, not only the correctness of the index file can be verified, but also whether the storage location of the index entry is correct can be verified, thereby saving time and improving the efficiency of verification.

Figure 4:
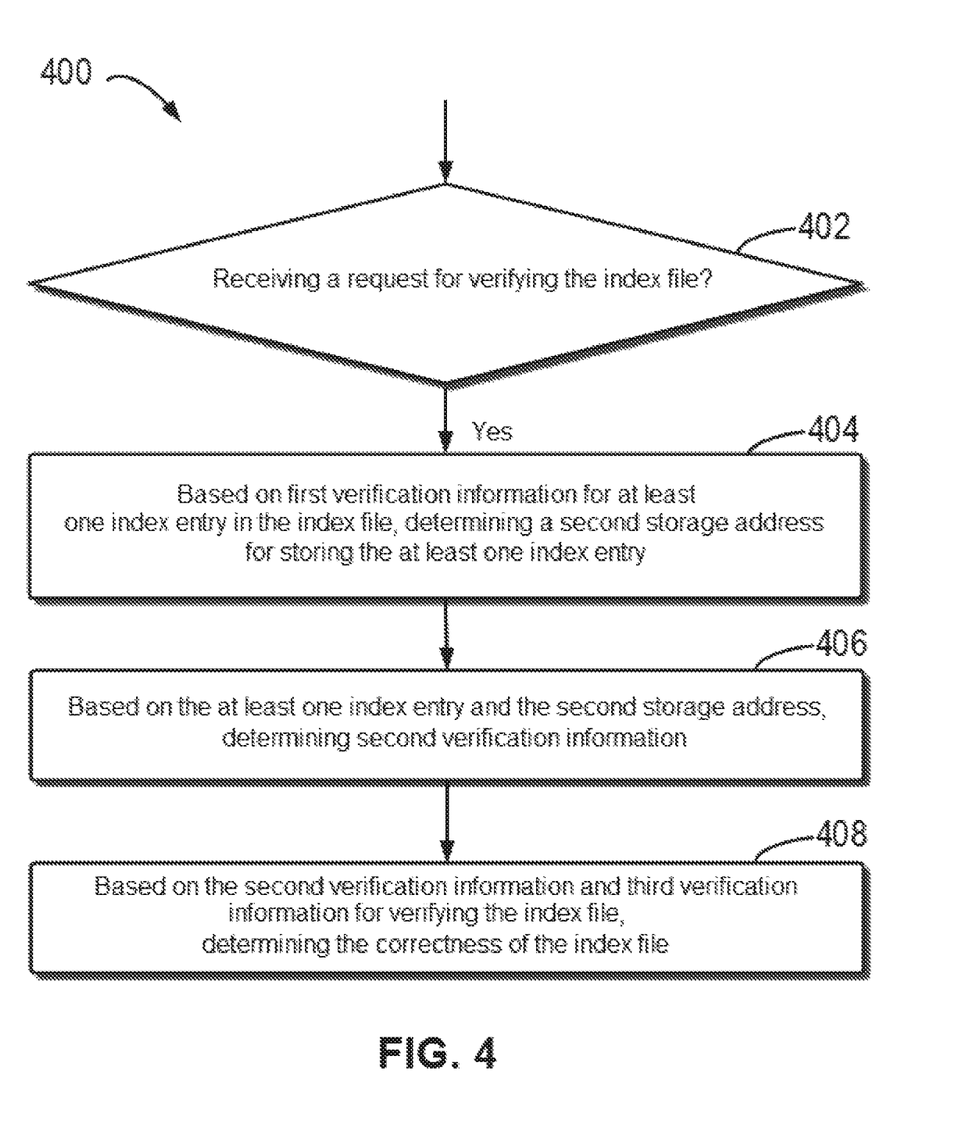
FIG. 4 illustrates a flowchart of method 400 for verifying an index file according to an embodiment of the present disclosure.

Method 300 for establishing an index file according to an embodiment of the present disclosure has been described above with reference to FIG. 3. Hereinafter, the process of verifying an index file will be described with reference to FIG. 4. FIG. 4 illustrates a flowchart of method 400 for verifying an index file according to an embodiment of the present disclosure. Method 400 in FIG. 4 may be performed by computing device 204 in FIG. 2 or any other suitable devices.

At block 402, computing device 204 determines whether a request for verifying index file 206 is received. In some embodiments, index file 206 is verified regularly. In some embodiments, a client may request computing device 204 to verify index file 206.

Upon receiving the request for verifying index file 206, at block 404, based on first verification information for at least one index entry in index file 206, computing device 204 determines a second storage address for storing the at least one index entry, wherein the first verification information is used for verifying a data block corresponding to the at least one index entry. Since the index entry stores the first verification information for the data block, the first verification information can be determined directly from the index entry. Computing device 204 may perform a second hash operation on the first verification information to determine the second storage address of the index entry.

At block 406, computing device 204 determines the second verification information based on the at least one index entry and the second storage address. In some embodiments, the index entry and its corresponding second storage address are combined together. For example, as in the case of storing the index entry, the second storage address is attached after the index entry, or the index entry is attached after the second storage address.

In some embodiments, the at least one index entry includes multiple index entries. Computing device 204 generates multiple verification values based on the multiple index entries and multiple second storage addresses for storing the multiple index entries. Then, computing device 204 determines the second verification information by performing an XOR operation on the multiple verification values. By performing the XOR operation on the multiple verification values, the speed of verification can be increased.

At block 408, computing device 204 determines the correctness of index file 206 based on the second verification information and third verification information for verifying index file 206. After determining that the index file 206 is correct, no processing is performed or a report is given to inform that index file 206 is correct. If it is determined that index file 206 is incorrect, an error needs to be reported.

In some embodiments, computing device 204 determines that index file 206 is correct based on a determination that the second verification information matches the third verification information. In some embodiments, computing device 204 acquires the third verification information from the header of index file 206. This third verification information is historical verification information generated during the establishment of index file 206 as shown in FIG. 3.

Through the above method, the index file can be verified quickly, and whether the storage location of the index entry is correct can also be verified, which improves the efficiency of verifying the index file, saves a lot of verification time, and improves the utilization rate of computing resources.

Figure 5:
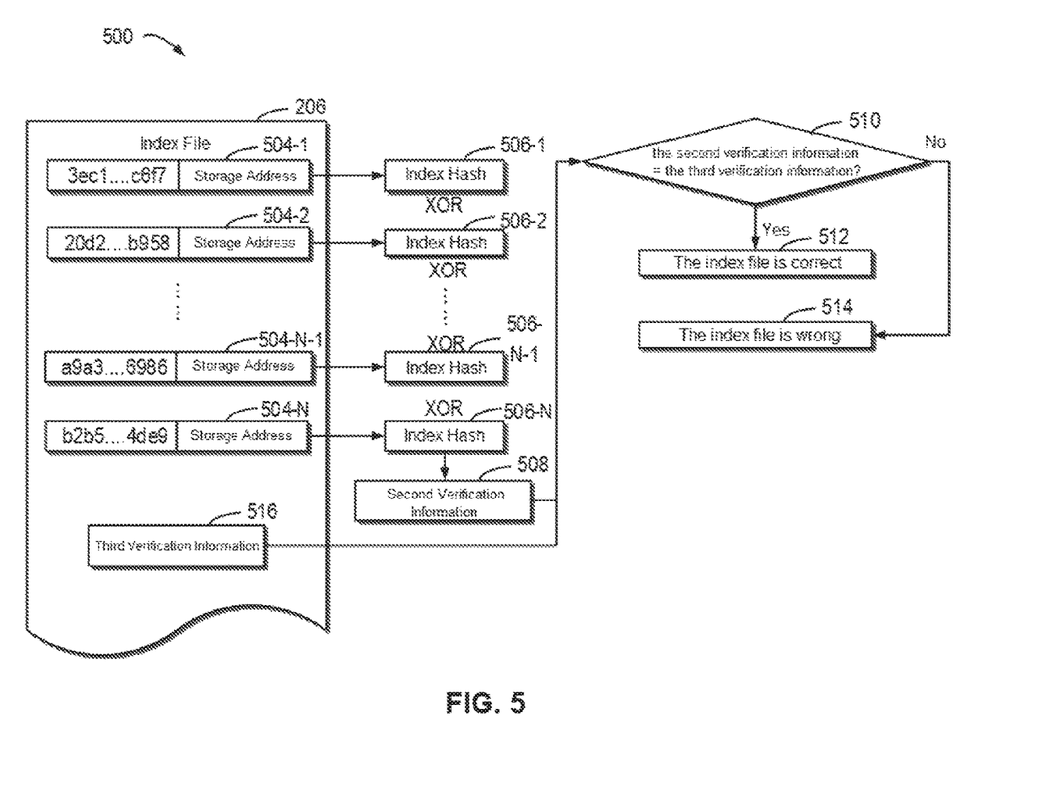
FIG. 5 illustrates a flowchart for verifying index file 500 according to an embodiment of the present disclosure.

Method 400 for verifying an index file according to an embodiment of the present disclosure has been described above with reference to FIG. 4. Hereinafter, the process of verifying an index file will further be described with reference to FIG. 5. FIG. 5 illustrates a flowchart of method 500 for verifying an index file according to an embodiment of the present disclosure.

In FIG. 5, index file 206 stores index entries 504-1, 504-2, . . . , 504-N−1, and 504-N, where N is a positive integer. For convenience of description, they are collectively referred to as index entry 504. When verifying index file 206, for each index entry 504, computing device 204 performs a hash operation on each index entry 504 and its offset address in index file 206 to obtain corresponding index hashes 506-1, 506-2, . . . , 506-N−1, and 506-N. Then, computing device 204 performs an XOR operation on index hashes 506-1, 506-2, . . . , 506-N−1, and 506-N to generate second verification information 508. Then, computing device 204 will also acquires third verification information 516 from index file 206. When the verification of index file 206 is performed after index entry 212 is stored, as shown in FIG. 3, this third verification information 516 is the third verification information generated as the new historical verification information in the method shown in FIG. 3.

After obtaining second verification information 508 and third verification information 516, at block 510, computing device 204 compares second verification information 508 with third verification information 516. If the two pieces of verification information match, at block 512, computing device 204 determines that index file 206 is correct. If the two pieces of verification information do not match, at block 514, computing device 204 determines that index file 206 is wrong.

Figure 6:
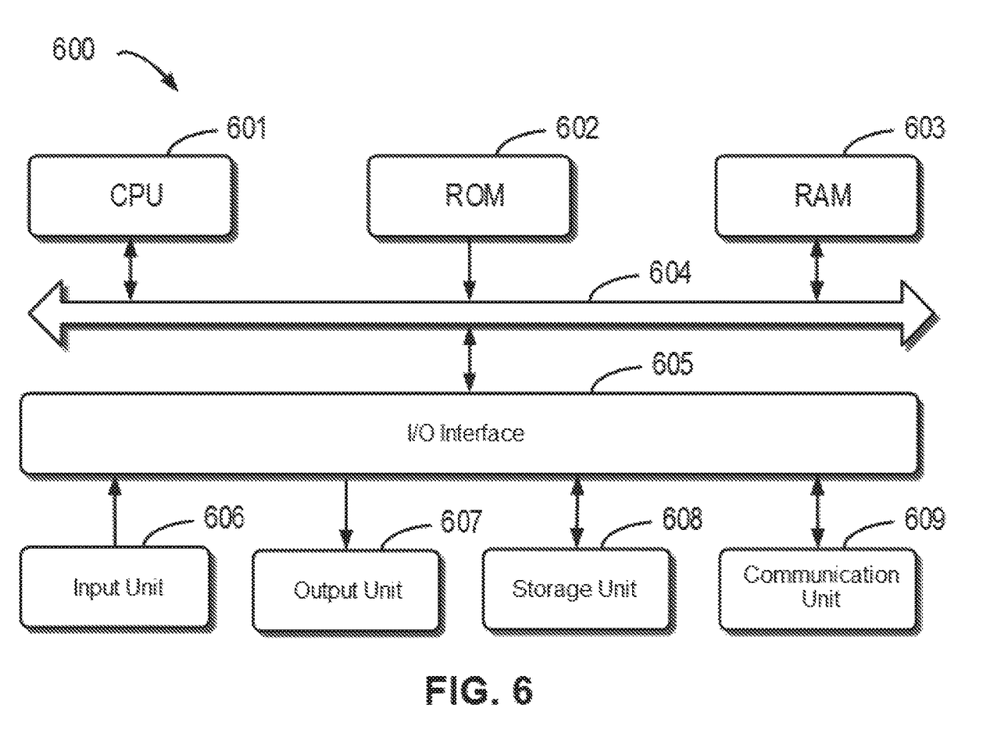
FIG. 6 illustrates a schematic block diagram of example device 600 suitable for implementing the embodiments of the content of the present disclosure.

FIG. 6 illustrates a schematic block diagram of example device 600 that can be used to implement the embodiments of the content of the present disclosure. For example, computing device 204 shown in FIG. 2 can be implemented by device 600. As shown, device 600 includes central processing unit (CPU) 601 which can perform various appropriate actions and processes according to computer program instructions stored in read only memory (ROM) 602 or computer program instructions loaded from storage unit 608 into random access memory (RAM) 603. In RAM 603, various programs and data required for the operation of device 600 can also be stored. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices through a computer network such as the Internet and/or various telecommunication networks.

The various processes and processing described above, for example, methods 300 and 400, can be performed by processing unit 601. For example, in some embodiments, methods 300 and 400 may be implemented as computer software programs that are tangibly included on a machine-readable medium, for example, storage unit 608. In some embodiments, part or all of the computer program may be loaded and/or installed on device 600 via ROM 602 and/or communication unit 609. When a computer program is loaded into RAM 603 and executed by CPU 601, one or more actions of methods 300 and 400 described above may be performed.

The present disclosure can be a method, system, and/or computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. Computer-readable storage media used herein are not to be interpreted as transient signals per se, such as radio waves or other freely propagating electromagnetic waves, electromagnetic waves propagating through waveguides or other transmission media, for example, light pulses through fiber optic cables, or electrical signal transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages, such as Smalltalk and C++, and conventional procedural programming languages, such as the "C" language or similar programming languages. Computer-readable program instructions may be executed entirely on a user's computer, partly on a user's computer, as a stand-alone software package, partly on a user's computer and partly on a remote computer, or entirely on a remote computer or server. In the case involving a remote computer, the remote computer can be connected to a user's computer through any kind of network, including a local area network (LAN) or a wide area network (WAN), or it can be connected to an external computer (for example, connected through the Internet using an Internet service provider). In some embodiments, an electronic circuit is personalized by utilizing state information of the computer-readable program instructions, for example, a programmable logic circuit, a field programmable gate array (FPGA), or a programmable logic array (PLA), wherein the electronic circuit may execute computer-readable program instructions so as to implement various aspects of the present disclosure.

Various aspects of the present disclosure are described herein with reference to flowcharts and/or block diagrams of the method, the system, and the computer program product according to embodiments of the present disclosure. It should be understood that each block of the flowcharts and/or block diagrams and combinations of blocks in the flowcharts and/or block diagrams can be implemented by computer-readable program instructions.

These computer-readable program instructions can be provided to a processing unit of a general-purpose computer, a special-purpose computer, or a further programmable data processing means, thereby producing a machine, such that these instructions, when executed by the processing unit of the computer or the further programmable data processing means, produce a means for implementing the functions/actions specified in one or more blocks in the flowcharts and/or block diagrams. These computer-readable program instructions may also be stored in a computer-readable storage medium, and these instructions cause a computer, a programmable data processing means, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions can also be loaded onto a computer, a further programmable data processing means, or a further device, so that a series of operating steps can be performed on the computer, the further programmable data processing means, or the further device to produce a computer-implemented process, such that the instructions executed on the computer, the further programmable data processing means, or the further device can implement the functions/actions specified in one or more blocks in the flowcharts and/or block diagrams.

The flowcharts and block diagrams in the accompanying drawings illustrate the architectures, functions, and operations of possibly implementations of the systems, methods, and computer program products according to multiple embodiments of the present disclosure. In this regard, each block in the flowcharts or block diagrams may represent a module, a program segment, or a part of an instruction, which contains one or more executable instructions for implementing specified logical functions. In some alternative implementations, the functions marked in the blocks may also occur in a different order than those marked in the accompanying drawings. For example, two consecutive blocks may actually be executed substantially in parallel, and they may sometimes be executed in the reverse order, depending on the functions involved. It should also be noted that each block in the block diagrams and/or flowcharts and combinations of blocks in the block diagrams and/or flowcharts can be implemented by a dedicated hardware-based system that performs the specified function or action, or can be implemented by a combination of dedicated hardware and computer instructions.

The embodiments of the present disclosure have been described above. The above description is exemplary and not exhaustive, and is not limited to the disclosed embodiments. Many modifications and variations will be apparent to those skilled in the art without departing from the scope and spirit of the described embodiments. The terminology used herein is chosen to best explain the principles of the embodiments, practical applications, or technical improvements to technologies in the market, or to enable other ordinary skilled persons in the art to understand the embodiments disclosed herein.

The invention claimed is:

1. A method for establishing an index file, comprising:
   in response to receiving a data block to be stored in a backup file system, determining first verification information for verifying the data block and a first storage address for storing the data block in the backup file system;
   based on the first verification information, determining an index entry for the data block and a second storage address for storing the index entry, wherein the index entry includes the first verification information and the first storage address, and the index entry will be included in the index file, and wherein determining the second storage address comprises determining an offset address of the index entry in the index file;
   based on the index entry and the second storage address, determining second verification information; and
   based on the second verification information and historical verification information for the index file, determining third verification information for verifying the index file;
   wherein determining the first verification information comprises:
      performing a first hash operation on the data block to determine the first verification information;
   wherein determining the second storage address comprises:
      performing a second hash operation on the first verification information, and
      based on a result of the second hash operation, determining the offset address of the index entry in the index file; and
   wherein the historical verification information is determined from previously stored index entries.

2. The method according to claim 1,
   wherein the index entry further includes the second storage address, and
   wherein determining the second verification information comprises:
      generating the second verification information by performing a third hash operation on the first verification information, the first storage address, and the second verification information in the index entry.

3. The method according to claim 1, further comprising:
   storing the third verification information in the historical verification information.

4. The method according to claim 1, wherein determining the third verification information comprises:
   generating the third verification information by performing an XOR operation on the second verification information and the historical verification information.

5. The method according to claim 1, further comprising:
   storing the third verification information in a header of the index file.

6. A method for verifying an index file, comprising:
   in response to receiving a request for verifying the index file, based on first verification information in at least one index entry in the index file, determining a second storage address for storing the at least one index entry, wherein the first verification information is used for verifying a data block corresponding to the at least one index entry, wherein determining the second storage address for storing the at least one index entry comprises determining an offset address of the index entry in the index file, and wherein the data block is stored in a backup file system;
   based on the at least one index entry and the second storage address, determining second verification information; and
   based on the second verification information and third verification information for verifying the index file, determining correctness of the index file,
   wherein the first verification information is determined by:
      performing a first hash operation on the data block to determine the first verification information;
   wherein determining the second storage address comprises:
      performing a second hash operation on the first verification information; and
      based on a result of the second hash operation, determining the offset address of the index entry in the index file; and
   wherein the third verification information is determined based on the second verification information and historical information determined from previously stored index entries.

7. The method according to claim 6,
   wherein the at least one index entry includes multiple index entries, and
   wherein determining the second verification information comprises:
      generating multiple verification values based on the multiple index entries and multiple second storage addresses for storing the multiple index entries; and
      determining the second verification information by performing an XOR operation on the multiple verification values.

8. The method according to claim 6, wherein determining the correctness of the index file comprises:
   determining that the index file is correct according to a determination that the second verification information matches the third verification information.

9. The method according to claim 6, further comprising:
   acquiring the third verification information from a header of the index file.

10. An electronic device, comprising: a processor; and
    a memory storing computer program instructions, wherein the processor executes the computer program instructions in the memory to control the electronic device to execute a method, the method comprising:
    in response to receiving a data block to be stored in a backup file system, determining first verification information for verifying the data block and a first storage address for storing the data block in a backup file system;
    based on the first verification information, determining an index entry for the data block and a second storage address for storing the index entry, wherein the index entry includes the first verification information and the first storage address, and the index entry will be included in an index file, and wherein determining the second storage address comprises determining an offset address of the index entry in the index file;
    based on the index entry and the second storage address, determining second verification information; and based on the second verification information and historical verification information for the index file, determining third verification information for verifying the index file,
wherein determining the first verification information comprises:
performing a first hash operation on the data block to determine the first verification information;
wherein determining the second storage address comprises:
performing a second hash operation on the first verification information; and
based on a result of the second hash operation, determining the offset address of the index entry in the index file; and
wherein the historical verification information is determined from previously stored index entries.

11. The electronic device according to claim 10, wherein the index entry further includes the second storage address, and determining the second verification information comprises:

generating the second verification information by performing a third hash operation on the first verification information, the first storage address, and the second verification information in the index entry.

12. The electronic device according to claim 10, wherein the method further comprises:

storing the third verification information in the historical verification information.

13. The electronic device according to claim 10, wherein determining the third verification information comprises:

generating the third verification information by performing an XOR operation on the second verification information and the historical verification information.

14. The electronic device according to claim 10, wherein the method further comprises:

storing the third verification information in a header of the index file.

* * * * *